May 5, 1970  J. L. MORTON  3,509,770
SAMPLING PROCESS AND APPARATUS FOR PAVING MATERIAL PLANTS
Filed Sept. 21, 1967  3 Sheets-Sheet 1

INVENTOR.
JAMES L. MORTON
BY
Woodard, Weikart, Emhardt & Naughton
Attorneys

May 5, 1970        J. L. MORTON        3,509,770

SAMPLING PROCESS AND APPARATUS FOR PAVING MATERIAL PLANTS

Filed Sept. 21, 1967        3 Sheets-Sheet 2

INVENTOR.
JAMES L. MORTON
BY
Woodard, Weikart, Emhardt & Naughton
Attorneys

United States Patent Office 3,509,770
Patented May 5, 1970

3,509,770
SAMPLING PROCESS AND APPARATUS FOR
PAVING MATERIAL PLANTS
James L. Morton, New Palestine, Ind., assignor to
American Hoist & Derrick Co., St. Paul, Minn., a
corporation of Delaware
Filed Sept. 21, 1967, Ser. No. 669,557
Int. Cl. G01n 1/20
U.S. Cl. 73—421                          11 Claims

ABSTRACT OF THE DISCLOSURE

An asphalt plant having a batch weighing box for aggregate, provided with a sampling plurality of chutes mounted thereto, each different chute having an inlet under a different one of the discharge gates of aggregate storage bins above the box, and each chute having an outlet conveniently located outside the box to facilitate disposition of a sample receiving bucket under the outlet. A shiftable frame in the weighing box with deflector shields normally covering the chute inlets. A pneumatic cylinder connected to the frame and controllable by a manually operable switch for shifting the frame, and thereby the shield members, when desired during discharge of aggregate from one of the bins to the box to permit some of the aggregate to enter a chute inlet for passage therethrough to the exterior of the box and reception in the sample receiver. A plurality of lights associated with the cylinder controller switch to aid an inspector in timing the operation of the shiftable frame for taking a sample from the desired bin.

BACKGROUND OF THE INVENTION

Field of the invention

This invention relates generally to apparatus for taking samples of materials, and more particularly to apparatus facilitating the sampling of flowable solid materials such as in an asphalt palnt, for example.

Description of the prior art

Various types of apparatus are known for sampling, dividing, or otherwise handling flowable solid materials. Examples are shown in the following patents: 2,379,921, Pizzirani et al., July 10, 1945; 3,071,969, Cline et al., Jan. 8, 1963; 3,319,469, Hartung, May 16, 1967.

It is desirable that asphalt plants be versatile in order to be able to provide various mixes to meet specifications of different customers. It is therefore common to provide several aggregate storage bins, each containing aggregate within a different range of particle size. To provide a desired mix, a certain amount of aggregate from one or more of the bins is discharged through a gate at the bottom into a weighing box or "batcher" from which a batch having the desired proportions as determined by weighing, is discharged into a mixer.

Various customers require periodic sampling of material discharge from the bins to determine whether or not it meets the specifications. To get such samples, it is commonplace for inspectors to provide a pan at the end of a long pole and project it through an access door into position under a bin discharge gate to receive a sample as material is discharged from the bin to the weighing box.

The aforementioned procedure has a number of disadvantages. There is not much room for the inspector to work and the sampling pan is comparatively heavy. Samples are required several times a day, and it is a dirty job to obtain them. Some units require passage of the sample pan under several bin discharge gates before disposition under the particular one of interest, resulting in contamination from dribbling of the gates under which the sample pan has passed. It usually necessitates interruption of an otherwise automatic sequencing of bin gate operation, with the consequent disturbance of production. The present invention avoids all of the aforementioned problems.

SUMMARY

Described briefly, a typical embodiment of the present invention mounts a plurality of sampling chutes on the weigh batcher, with each different chute having its inlet under the discharge gate of a different one of the bins. A shuttle frame is provided in the batcher with a cover over each of the inlets to preclude entry of discharged material into any chute unless the frame is shifted. The chute outlets are provided outside the weigh batcher at a convenient location to enable the inspector to provide a sample bucket under any or all of the chute outlets, as desired. Indicator lights are provided on a panel convenient to the inspector to indicate which bin discharge gate is open at any time, and a switch is provided for his use to shift the frame and admit discharged material to a chute from a particular bin to be sampled.

BRIEF DESCRIPTION OF THE DRAWING

The full nature of the invention will be understood from the accompanying drawings and the following description and claims.

Figure 1:
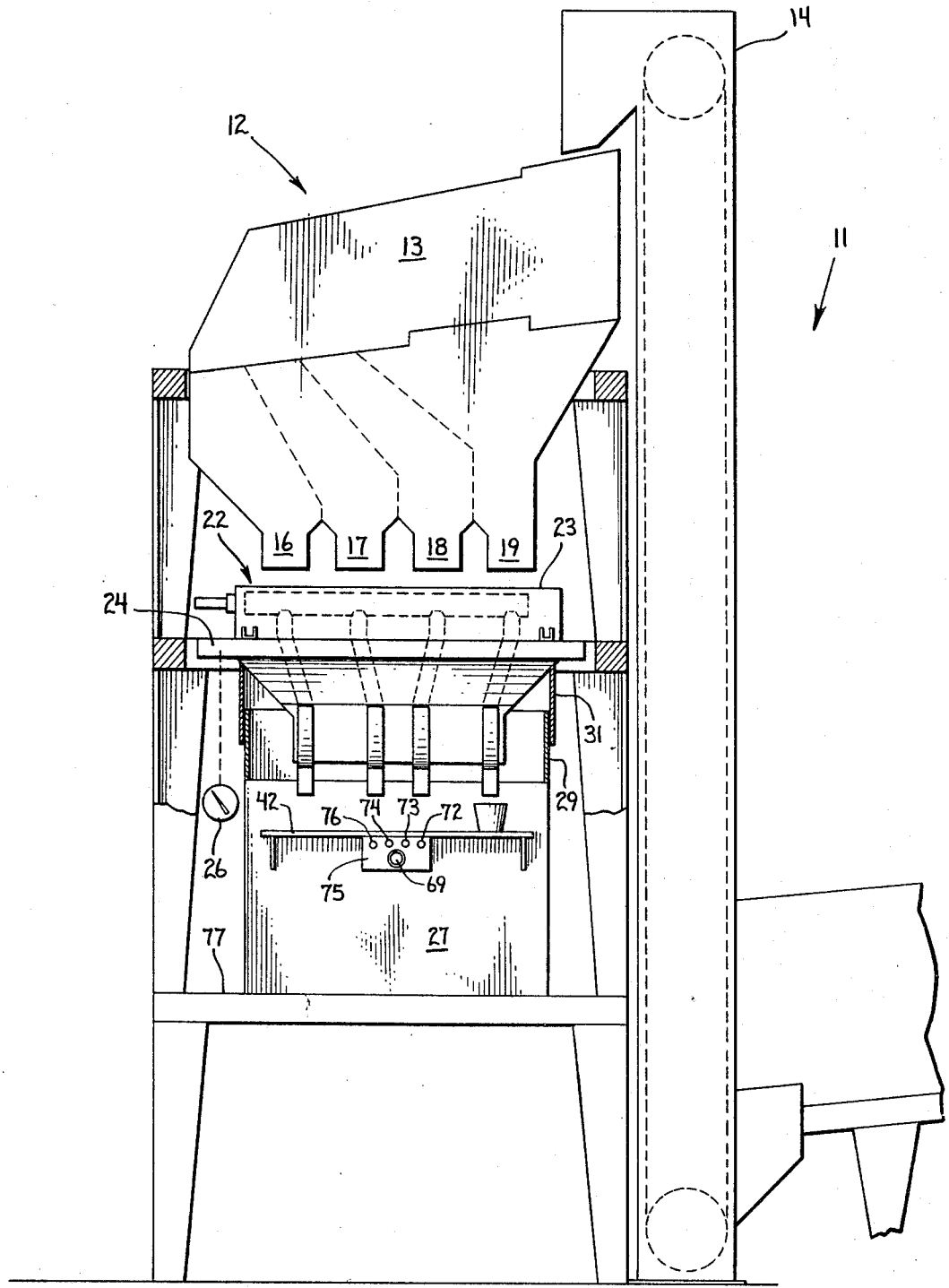
FIG. 1 is a simplified elevational view of the tower portion of an asphalt plant incorporating a typical embodiment of the invention.

DESCRIPTION OF THE PREFERRED
EMBODIMENT

Referring now to the drawings in detail, the asphalt plant 11 is provided with a tower 12 wherein a vibrating screen at 13 receives aggregate from an elevator 14. The screen separates aggregate into proper sizes and in the illustrated embodiment, deposits the aggregate in one of four bins 16, 17, 18, or 19, depending upon the size of the aggregate. Each of these bins has a discharge opening at the bottom normally closed by a gate shown schematically at 21 for bin 19. Each of the gates is provided with a double acting pneumatic cylinder 20 for operation thereof, the gate for each bin being operable independently of that for each other bin.

The weigh batcher or hopper 22 is mounted under the gates, having an open top at 23 for reception of material from whichever gate is opened, whenever the gate is opened. This weigh batcher is mounted on scale apparatus indicated schematically at 24 with the scale indicator dial 26 being connected thereto for use by the operator in obtaining the right proportions for each batch. A mixer 27 is provided under the weigh hopper to receive the weighed batch discharged through the bottom opening of the hopper by means of a gate shown schematically at 28. The mixer is provided with an upwardly extending dust shroud 29 received within the downwardly extending dust shroud 31 on the weigh batcher, there being no contact therebtween in order to avoid interference with the weighing function of the weigh hopper. The discharged batch is mixed with hot asphalt in the mixer.

According to the illustrated embodiment of the present invention four chutes 33, 34, 36, and 37 are mounted to the batcher, each chute beginning at an inlet such as 38 and extending downwardly and outwardly therefrom through the wall of the batcher to an outlet as at 39 exterior to and separate from the batcher. The outlet is disposed at a convenient distance above a walkway grating 41 provided on a support 42 mounted to the mixer 27. This enables an inspector to conveniently mount a sample depository in the form of a bucket 43 or other device on the grating 41 immediately under the outlet 39. A similar bucket can be provided under each of the other chute outlets. Each chute is inwardly tapered as at 44 near the inlet 38 to assure free flow downwardly therethrough of any material entering the inlet.

Figure 2:
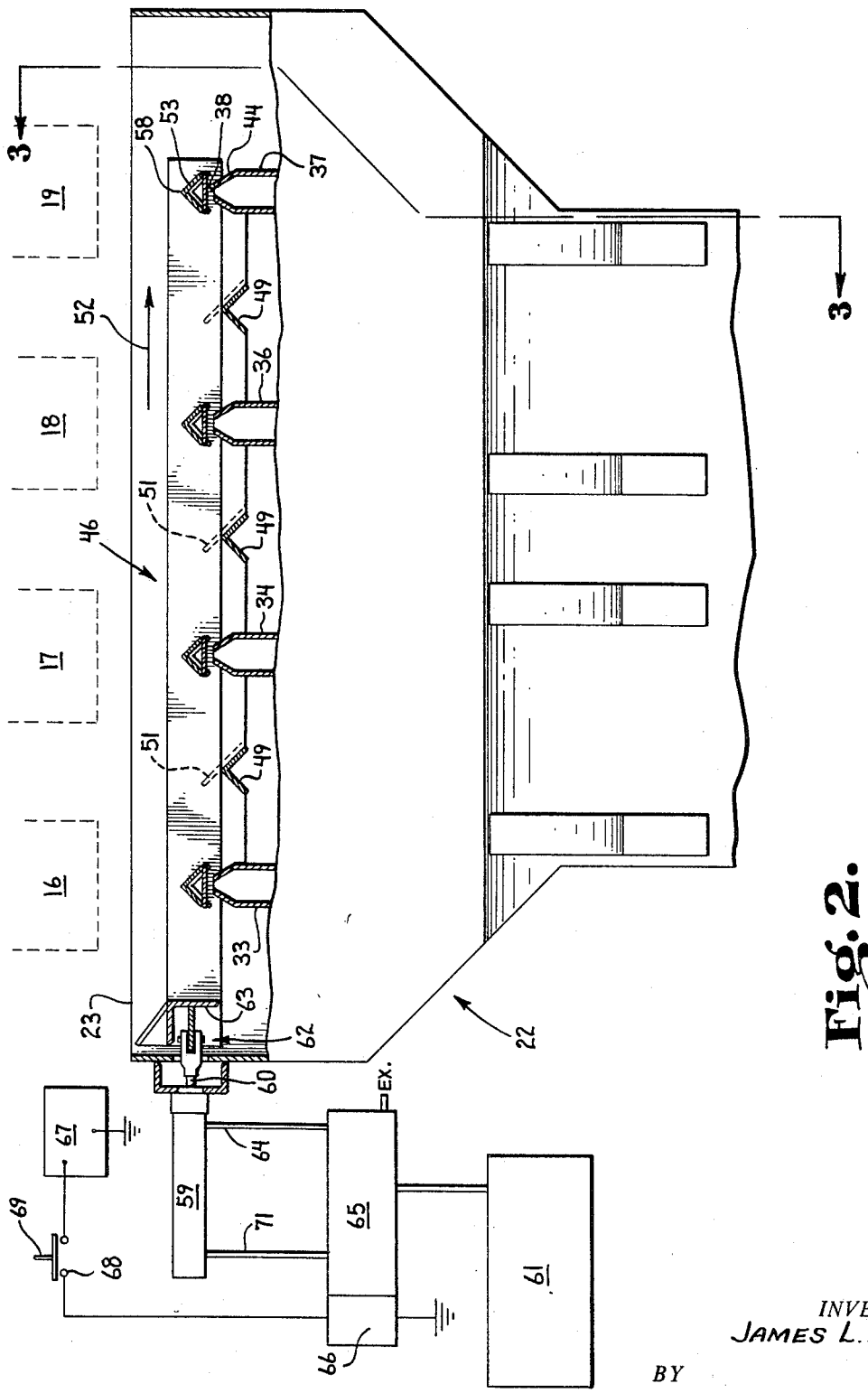
FIG. 2 is an enlarged fragmentary side elevational view of the weigh box or "batcher," with a portion broken away to show in section the shuttle frame, and also showing schematically the electrical and pneumatic controls therefor.

Further according to the invention, means are provided to normally prevent entrance of any material into the chute inlets. For this purpose, in the illustrated example, a shuttle frame 46 is constructed of a pair of large angle sections 47 and 48 mounted on three cross tie members in the form of angle sections 49 affixed to and extending across the batcher. Plates 51 are affixed to these members 49 and serve as guides to maintain alignment of the shutttle frame as it is reciprocated from its normal position as shown to a second position in the direction of the arrow 52 (FIG. 2) and then back to normal position.

The inlet for each chute is normally covered by an angle section such as angle section 53 covering the inlet 38 for chute 37. This member is mounted to a pair of stub angle sections 54 and 56 (FIG. 3) affixed to the shuttle frame members 47 and 48, respectively. Bolts can be used at locations 57 for mounting member 53 to the stub angles and facilitate removal and replacement of member 53. The member 53 being disposed beneath the gate for bin 19 and covering the inlet 38 serves as a shield preventing entry of material into chute 37 while the shuttle frame is in the normal position shown. With the ridge 58 of the member 53 pointing toward the bin gate, and sides of the member sloping downwardly and outwardly from the ridge, the member serves to divert any material dropping thereon away from the chute inlet and into the weigh batcher.

A pneumatic cylinder 59 is mounted to the weigh batcher and the piston rod 60 thereof is connected through a suitable yoke, pin and bracket assembly 62 to a cross member 63 at the end of the shuttle frame. Cylinder 59 is normally supplied with air from air supply source 61 through the fourway air valve 65 and line 64. The valve is provided with an operating solenoid 66 in series with a source 67 of electrical energy and a manually operable momentary-contact push-button type switch 68. When the button 69 thereof is pushed and the circuit is closed, the solenoid is energized, shifting valve 65 to vent line 64 and supply air from the source through line 71 to the pneumatic cylinder, shifting the shuttle frame in the direction of the arrow 52 so that all of the chute inlets are uncovered. So long as the shuttle frame remains in this position, a sample or samples will be taken by the chutes under any bins whose gates are opened, while the aggregate flows from the bins into the weigh box.

When a plant is on an automatic operating cycle, it is possible that the speed of operation would be such that each bin would be opened once each minute. To enable the inspector to better time and control of the size of each of his samples, another feature of the invention provides an indicator light to designate when each bin is being opened. Accordingly, four lights 72, 73, 74 and 76 (FIG. 1) are provided on a panel 75 mounted to the support 42. This panel also has the push-button 69 mounted thereon. The support, indicator lights, and push-button are conveniently located approximately waist-high above the batch deck 77 of the tower.

Figure 3:
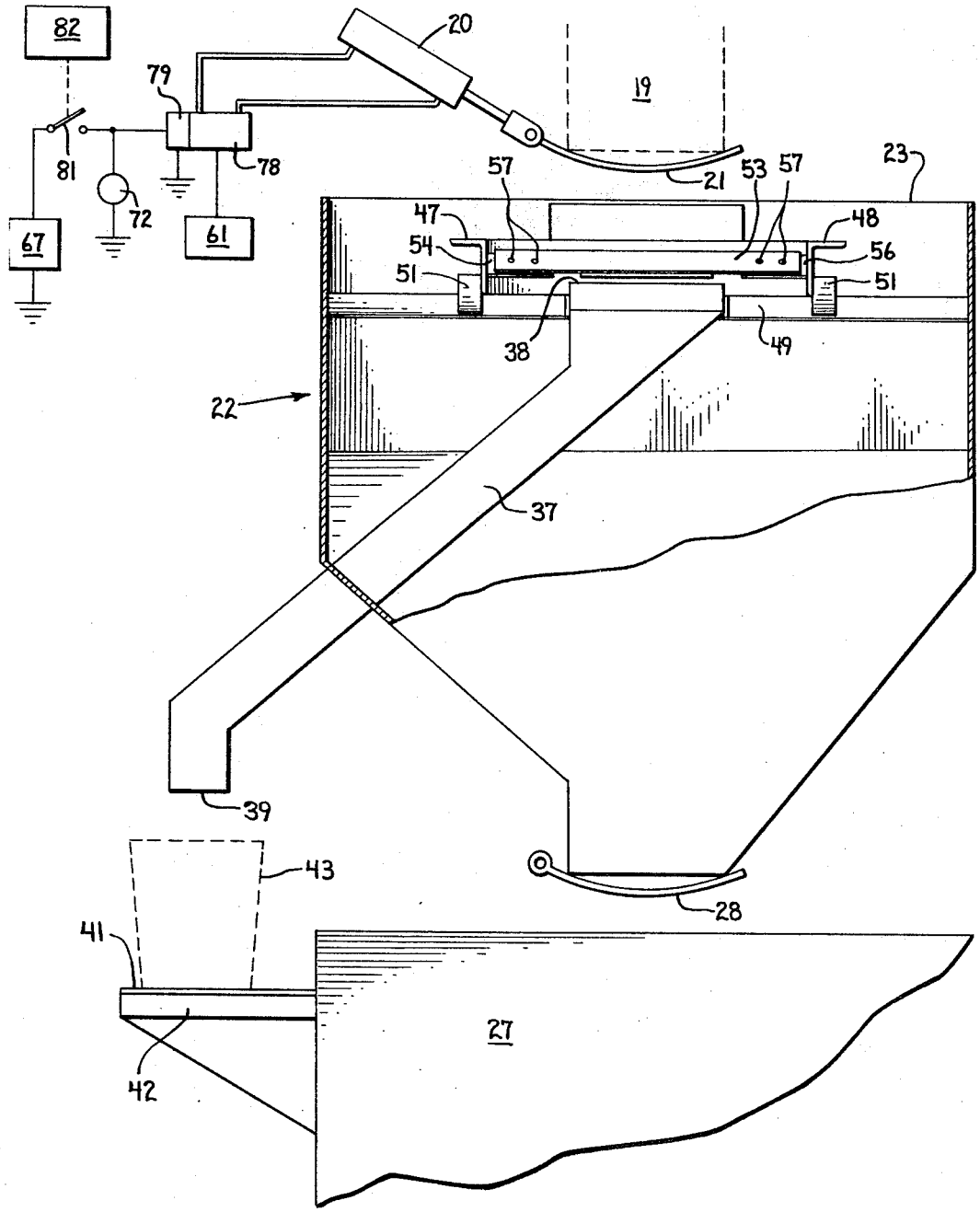
FIG. 3 is an enlarged fragmentary end elevational view of the weigh box with mixer below it, a portion of the box being broken away to show further details of the shuttle frame and sampling chutes; and also showing schematically a bin discharge gate and pneumatic and electric controls therefor.

Each of the indicator lights is associated with its respective bin gate control circuit, one example for bin gate 21 and light 72 being shown schematically in FIG. 3. In this example, valve 78, operated by solenoid 79, controls the supply of air from source 61 to the opposite ends of the pneumatic cylinder 20 operating bin gate 21. The control solenoid 79 is connected in parallel with indicator light 72, both being energized simultaneously upon closure of the switch 81 operated by the automatic cycle controller 82, which is not a part of the present invention.

So it is that by pushing button 69 while a certain one of the indicator lights is illuminated, the inspector can obtain a sample from the corresponding bin. The switch 68 will automatically open upon release of the button 69, so that duration of closure will determine the size of the sample. Normally a sample of adequate size can be obtained by only momentary closure of the switch.

From the foregoing it can be seen that the present invention overcomes all of the disadvantages of the prior are procedures. If the inspector wishes to use a different bucket under each of the chute outlets simultaneously, he can do so, and by pushing the button at the appropriate time during illumination of each different lamp, he can obtain all his samples during a single cycle of bin gating, all within a minute if he wishes to do so. There is no possibility of contamination of the sample in one bucket by material from a different bin. If he wishes to use one bucket for taking all samples, and keep the samples separate in separate containers, he can sample from one chute during one cycle, from another chute during the next cycle and so on until he has obtained a sample from each of the bins.

From the foregoing description, it will be apparent that the chutes can be extended to grade, if desired and any number can be provided according to the number of bins to be sampled. Any number of samples can be taken at any time without interference with the automatic and continuous operation of the plant.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. In a container having an entrance opening for admission of flowable material thereto, and an exit opening for discharge of flowable material therefrom, the combination comprising:

sampling chute means having an inlet in said container near said entrance, said chute means extending from said inlet through a wall in said container to an outlet;

exclusion means adjacent said inlet and normally preventing admission thereto of material flowing into said container;

actuator means coupled to one of said aforementioned means and operable, when actuated, to change the relative position of said exclusion means and said inlet for admission to said chute means of a portion of the material flowing into said container;

and control means coupled to said actuator means and including a switch operable to effect operation of said actuator means to enable admission of said material to said inlet for taking a sample through said chute;

said chute means including a plurality of chutes, each having an inlet spaced from the inlet of each other to enable reception of flowing material by each at a different location near the entrance of said container;

said exclusion means including a member mounted in said container with a plurality of diverter shields spaced thereon, each shield normally covering one of said inlets, said member being movable by said actuator means upon operation thereof to simultaneously move all of said shields to positions uncovering their respective chute inlet.

2. In apparatus for assembling a desired composition of flowable materials, the combination comprising:
a plurality of storage bins for flowable material, each bin having a discharge gate operable independently of the discharge gate of each other bin for discharge of material from each bin independently of each other bin;
a container disposed to receive and contain material discharged by each of said gates;
a plurality of sampling chutes, each different chute having an inlet disposed in the path of material being discharged from a different one of said bins to thereby receive a material sample, and each chute extending from its inlet to an outlet for discharge of said material sample to a sample depository;
exclusion means associated with each of said inlets and normally preventing admission thereto of material discharged from said bins by said gates;
and actuator means coupled to said exclusion means and operable, when actuated, to enable admission to said inlets of material discharged from said bins by said gates during discharge thereof.

3. The combination of claim 2 wherein:
said container and chutes are mounted as a unit to scales for weighing the materials received and contained in said container.

4. The combination of claim 2 wherein:
all of said chute inlets are disposed in said container above the level of material contained therein, each of said chutes extending downwardly and outwardly in said container and through a wall of said container to said outlet separate from said container.

5. The combination of claim 2 wherein:
the outlet for each chute is located above a platform, accommodating collection of samples by location of buckets under said outlets.

6. The combination of claim 2 and further comprising:
control means coupled to said actuator means and including a switch manually operable for operation of said actuator means, for a desired period during operation of one of said gates to thereby obtain through one of said chutes a sample of the material discharged from one of said bins through said one gate toward said container.

7. The combination of claim 6 and further comprising:
a panel of indicator lights, each different one of said lights being associated with a different one of said gates for illumination of a light during operation of the corresponding bin gate, said lights being positioned for visibility thereof to an individual at said manually operable switch, to facilitate operation of said switch momentarily during illumination of one of said lights.

8. The combination of claim 7 and further comprising:
a mixer having a top opening;
said container having a bottom discharge opening above said mixer opening for discharge of container contents to said mixer;
a platform mounted to said mixer;
the said outlet for each of said chutes being disposed apart from said container and above said platform a suitable distance to facilitate insertion by said individual of sample receiver buckets under said outlets and resting of said buckets on the platform during operation of said switch for taking samples.

9. The combination of claim 2 wherein said exclusion means includes:
a frame mounted to said container for reciprocation thereon;
a plurality of shields mounted on said frame, each of said shields being mounted between one of said gates and one of said inlets;
said frame being reciprocable from a normal position to a second position moving said shields out from between said gates and said inlets, by operation of said actuator means.

10. The combination of claim 9 wherein:
said shields include elongated members of angle cross-section mounted on cross-tie members of angle cross-section and extending from one side member of said frame to the opposite side member of said frame, the ridge of said shields pointing toward said gates and the sides of said shields sloping away therefrom and diverting from said inlets and into said container material discharged from said gates while said frame is in said normal position.

11. The combination of claim 9 wherein said actuator means include a double acting fluid cylinder mounted to said container and having a piston rod connected to said frame, said combination further comprising:
a solenoid-operated fluid control valve normally supplying fluid from a source to one inlet of said cylinder to hold said frame in said normal position;
a solenoid connected to said valve and disposed in circuit with a source of electrical energy and a manually-operable normally-open switch;
said switch being manually closable to energize said solenoid and change said valve to supply fluid to another inlet of said cylinder to move the piston rod thereof and shift said frame to said second position.

References Cited

UNITED STATES PATENTS

| | | | |
|---|---|---|---|
| 1,860,107 | 5/1932 | Lein | 73—421 |
| 2,303,085 | 11/1942 | Maddox | 73—422 |
| 3,186,233 | 6/1965 | Koger | 73—421 |
| 3,253,470 | 5/1966 | Platzer | 73—423 |
| 2,893,602 | 7/1959 | Barber | 73—421 |
| 1,354,016 | 9/1920 | Boerner et al. | 73—425.2 |
| 2,245,519 | 6/1941 | Bailey | 73—423 |
| 2,737,315 | 3/1956 | Rose | 222—77 |

S. CLEMENT SWISHER, Primary Examiner

U.S. Cl. X.R.

73—423